United States Patent
Shi

(10) Patent No.: US 12,509,391 B2
(45) Date of Patent: Dec. 30, 2025

(54) HIGH-FREQUENCY VIBRATION NICKING DEVICE AND HIGH-FREQUENCY VIBRATION NICKING METHOD FOR MICROBEAD SURFACES

(71) Applicant: Inner Mongolia University of Technology, Hohhot (CN)

(72) Inventor: Yong Shi, Hohhot (CN)

(73) Assignee: Inner Mongolia University of Technology, Hohhot (CN)

( * ) Notice: Subject to any disclaimer, the term of this patent is extended or adjusted under 35 U.S.C. 154(b) by 358 days.

(21) Appl. No.: 18/097,597

(22) Filed: Jan. 17, 2023

(65) Prior Publication Data
US 2023/0242440 A1  Aug. 3, 2023

(30) Foreign Application Priority Data
Jan. 30, 2022  (CN) .......................... 202210113763.1

(51) Int. Cl.
C03C 19/00 (2006.01)
C03C 23/00 (2006.01)

(52) U.S. Cl.
CPC .............. C03C 19/00 (2013.01); C03C 23/00 (2013.01)

(58) Field of Classification Search
CPC ................................ C03C 19/00; C03C 23/00
See application file for complete search history.

(56) References Cited

U.S. PATENT DOCUMENTS

| | | | | |
|---|---|---|---|---|
| 3,490,584 A * | 1/1970 | Balamuth | ................ | B07B 1/34 |
| | | | | 209/357 |
| 3,782,547 A * | 1/1974 | Dietert | ..................... | B03B 5/26 |
| | | | | 209/268 |
| 9,239,036 B2 * | 1/2016 | Ehlert | ................... | F23D 11/345 |

* cited by examiner

Primary Examiner — Ryan J. Walters
(74) Attorney, Agent, or Firm — Sage Patent Group

(57) ABSTRACT

The high-frequency vibration nicking device for microbead surfaces includes a high-frequency vibration assembly and a container. Microbeads or mixed materials of the microbeads and a grinding material are filled in the container, and the vibration output end of the high-frequency vibration assembly is connected with the container to perform high-frequency vibration on the microbeads. The high-frequency vibration nicking method for microbead surfaces includes steps of adding the microbeads into the container, turning on the high-frequency vibration assembly, and performing high-frequency vibration motion on the microbeads in the container under the action of the high-frequency vibration assembly. According to the device and the method, the high-frequency vibration assembly generates high-frequency vibration to drive the microbeads to perform high-frequency vibration motion in a limited space, so that mutual collision and friction are generated among the microbeads, between the microbeads and the container wall and between the microbeads and the vibrating body.

6 Claims, 4 Drawing Sheets

HIGH-FREQUENCY VIBRATION NICKING DEVICE AND HIGH-FREQUENCY VIBRATION NICKING METHOD FOR MICROBEAD SURFACES

CROSS-REFERENCE TO RELATED APPLICATION

This patent application claims the priority of Chinese Patent Application No. 202210113763.1 filed on Jan. 30, 2022, the disclosure of which is incorporated by reference herein in its entirety as part of the present application.

TECHNICAL FIELD

The present disclosure relates to the technical field of microbead surface modification, in particular to a high-frequency vibration nicking device and a high-frequency vibration nicking method for microbead surfaces.

BACKGROUND

Glass microbeads, ceramic microbeads, fly ash microbeads and other microbeads have been widely used in medical treatment, chemical engineering, printing, photovoltaic cells, building materials and other fields. However, at present, all kinds of microbeads produced and applied in industry have smooth and closed surface morphology. Because of smooth surface, the surface adsorption capacity and adhesive force are low. Due to the closed surface, it is impossible to use the hollow structure of hollow microbeads to accommodate substances. The above factors greatly limit the application range of microbead materials.

In order to improve the adsorption capacity, bonding strength and material holding capacity of the microbeads, it is necessary to change the smooth surface morphology and open the inner cavity of the microbead, which is called surface modification of the microbeads. At present, acid (hydrofluoric acid, mixed acid) corrosion is used for modifying the surfaces of the microbeads, so that the surfaces of the microbeads become rough, and a channel between the surface and the hollow cavity is formed through corrosion. However, the acid corrosion method has the problems such as high cost, long processing time, complex process and difficult removal of residual acid.

SUMMARY

Therefore, the technical problem to be solved by the present disclosure is to provide a high-frequency vibration nicking device and a high-frequency vibration nicking method for microbead surfaces, which are simple in process and have obvious advantages in the aspects of cost, efficiency and environmental protection.

In order to solve the technical problem, the present disclosure provides the following technical scheme. A high-frequency vibration nicking device for microbead surfaces includes a high-frequency vibration assembly and a container, where microbeads or mixed materials of the microbeads and a grinding material are filled in the container, and an vibration output end of the high-frequency vibration assembly is connected with the container to perform high-frequency vibration on the microbeads, or the vibration output end of the high-frequency vibration assembly is in direct contact with the microbeads.

According to the high-frequency vibration nicking device for microbead surfaces, a range of high-frequency vibration processing frequency output by the vibration output end of the high-frequency vibration assembly is between 1 KHz and 200 KHz. On the basis of this application, those skilled in the art can choose the time of applying vibration to the microbeads, and frequency of vibration according to the actual needs.

Under the condition of the same processing frequency, in order to achieve the same grade of nicking, the smaller the particle size of the microbead, the longer the processing time is.

Under the condition of the same processing time, in order to achieve the same grade of nicking, the smaller the particle size of the microbead, the higher the processing frequency is.

In principle, for microbeads with different particle sizes, the smaller the particle size, the higher the processing frequency is and the longer the processing time is. Those skilled in the art can choose appropriate processing frequency and processing time according to the requirements of the particle size and nicking grade of the microbead without any creative efforts. For organic microbeads or inorganic microbeads used in actual industrial production, the particle size is less than or equal to 500 μm, and the processing time is 1-180 seconds.

According to the high-frequency vibration nicking device for microbead surfaces, electromagnetic excitation vibration is adopted when the high-frequency vibration processing frequency is between 1 KHz and 10 KHz, and ultrasonic vibration is adopted when the high-frequency vibration processing frequency is between 10 KHz and 200 KHz.

According to the high-frequency vibration nicking device for microbead surfaces, the microbeads are inorganic microbeads or organic microbeads, and diameters of the microbeads are less than or equal to 500 μm.

According to the high-frequency vibration nicking device for microbead surfaces, the high-frequency vibration assembly includes a vibration transducer and a frame, the vibration transducer and the container are both installed on the frame, the container is a closed or semi-closed hard container. The frame includes a bottom plate, a top plate and support shafts. The support shafts are fixedly connected at two sides of a top of the bottom plate through fixed seats, the top plate is fixedly connected to top ends of the support shafts, the vibration transducer is fixedly connected to a middle of the top plate. A middle of a top of the bottom plate is fixedly connected with a support rod, an upper end of the support rod is a polished rod, a lower end of the support rod is a threaded rod, the threaded rod is in threaded connection with an adjusting nut, a pressure spring, a gasket and a pressure sensor are sequentially sleeved on the support rod from bottom to top, an end of the pressure spring abuts against a top of the adjusting nut, another end of the pressure spring abuts against a bottom of the gasket, and a top of the gasket abuts against a bottom of the pressure sensor; and the container is an accommodating tank, the accommodating tank is installed on the top of the pressure sensor, the microbeads are filled into the accommodating tank, and an end of the vibration transducer is inserted into the accommodating tank.

According to the high-frequency vibration nicking device for microbead surfaces, the high-frequency vibration assembly includes vibration transducers and a frame, the vibration transducers and the container are all installed on the frame, the container is a closed or semi-closed hard container, the frame includes a cabinet, the vibration transducers are installed on two sides of the cabinet, ends of the vibration transducers are inserted into the cabinet, and a screw feeder is installed on a top of the cabinet; the container includes a first die and a second die, an end of one vibration transducer is fixedly connected with the first die, an end of the other vibration transducer is fixedly connected with the second die, the first die and the second die are oppositely arranged, and a gap between the first die and the second die is a microbead processing channel; a discharge end of the screw feeder is connected with a feed end of the microbead processing channel, a feed conveyor belt is arranged above the screw feeder, a discharge end of the microbead processing channel is connected with a discharge pipe, the discharge end of the discharge pipe passes through the cabinet, and a discharge conveyor belt is arranged below a discharge end of the discharge pipe; and opposite surfaces of the first die and the second die are concave-convex surfaces which are matched with each other, and a cross-section of the microbead processing channel is curved.

A high-frequency vibration nicking method for microbead surfaces, using the high-frequency vibration nicking device for microbead surfaces to perform high-frequency vibration nicking on the microbead surfaces, includes the following steps:

step A, adding microbeads or mixed materials of the microbeads and a grinding material into a container;

step B, turning on the high-frequency vibration assembly, wherein the vibration output end of the high-frequency vibration assembly is connected with the container, or the vibration output end of the high-frequency vibration assembly is in direct contact with the microbeads; and step C, performing high-frequency vibration on the microbeads by the high-frequency vibration assembly, wherein the microbeads in the container vibrate with high-frequency under action of the high-frequency vibration assembly, when only the microbeads are added into the container, mutual collision and friction are generated among the microbeads, between the microbeads and a container wall and between the microbeads and the vibration output end; and when the mixed materials of the microbeads and the grinding material are added into the container, mutual collision and friction are generated among the microbeads, between the microbeads and the container wall, between the microbeads and the vibration output end and between the microbeads and the grinding material.

According to the high-frequency vibration nicking method for microbead surfaces, the range of high-frequency vibration processing frequency output by the vibration output end of the high-frequency vibration assembly is between 1 KHz and 200 KHz.

According to the high-frequency vibration nicking method for microbead surfaces, the microbeads are inorganic microbeads or organic microbeads, and the diameter of the microbead is less than or equal to 500 µm.

According to the high-frequency vibration nicking method for microbead surfaces, the inorganic microbeads are glass microbeads, ceramic microbeads, fly ash, volcanic ash, silica microbeads, metal microbeads, metal oxide microbeads or alloy microbeads, and the organic microbeads are polymer microbeads and plastic microbeads.

The technical scheme of the present disclosure has the following beneficial technical effects.

Firstly, according to the device and the method, the high-frequency vibration assembly is used for generating high-frequency vibration to drive the microbeads to perform high-frequency vibration motion in a limited space, so that mutual collision and friction are generated among the microbeads, between the microbeads and the container wall and between the microbeads and the vibrating body. Due to the fact that positive and negative alternating vibration waves generated by the high-frequency vibration assembly drive the microbeads to move at extremely high acceleration, the microbeads are endowed with great acting force, so as to overcome the problem of insufficient impact force of the microbeads caused by the principle of system similarity. Under the high-frequency vibration, tens of thousands to hundreds of thousands of impacts and frictions can occur on a single microbead per second, so the surface morphology of the microbead can be changed in seconds to tens of seconds, the surface roughness of the microbeads is improved, and a channel between the inner cavity and the surface of hollow microbead is formed.

Secondly, according to the device and the method, compared with the existing strong acid corrosion method, the method has obvious advantages in the aspects of cost, efficiency and environmental protection, especially in the aspect of environmental protection. The method in the present disclosure is simple and effective, can realize large-scale industrial production, and has great significance for the popularization and application of microbead materials in various industries, especially for low-grade fly ash and volcanic ash with huge discharge amount.

Figure 1:
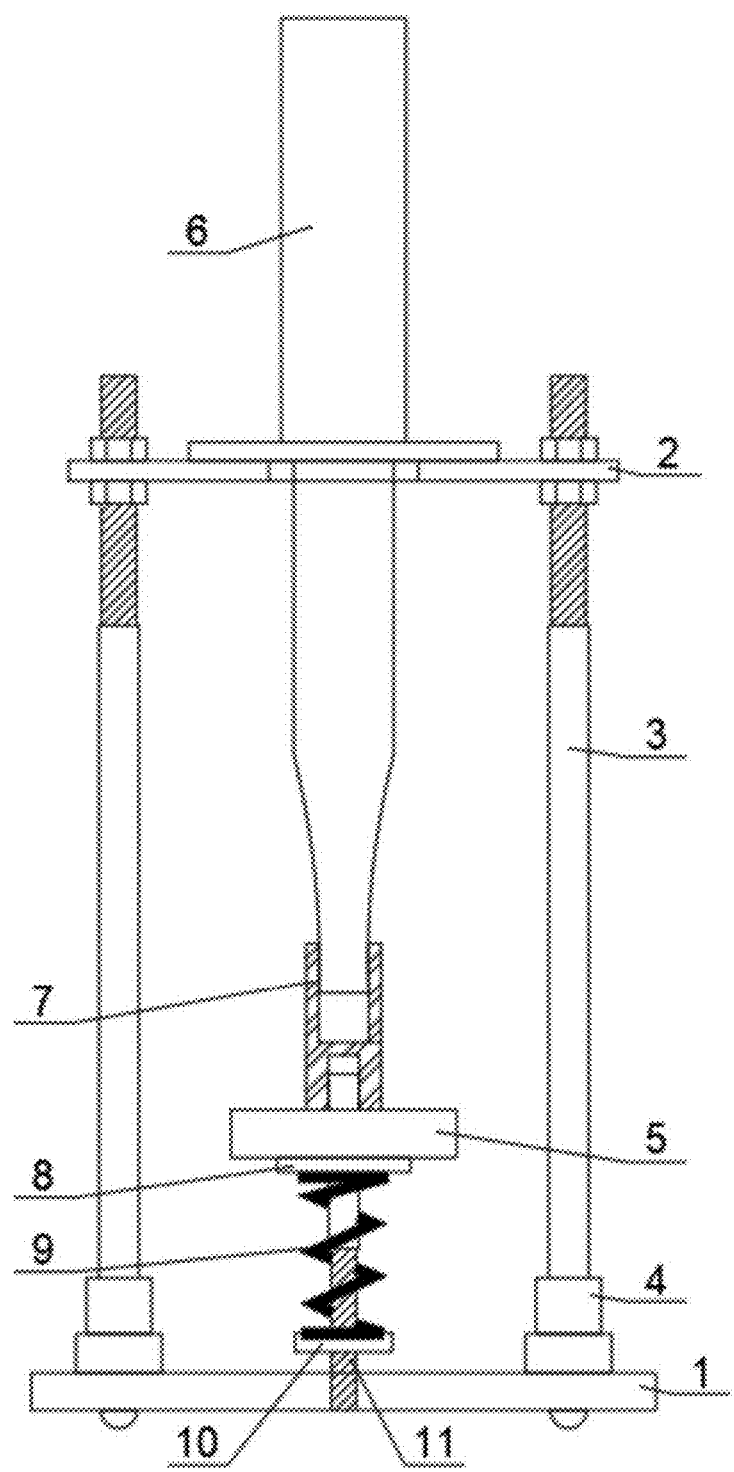
FIG. 1 is a structural schematic diagram of a test type processing device in Embodiment 1 of the present disclosure.

Reference numerals: 1 bottom plate; 2 top plate; 3 support shaft; 4 fixed seat; 5 pressure sensor; 6 vibration transducer; 7 accommodating tank; 8 gasket; 9 pressure spring; 10 adjusting nut; 11 support rod; 12 first die; 13 second die; 14 discharge pipe; 15 screw feeder; 16 discharge conveyor belt; 17 feed conveyor belt; and 18 cabinet.

DETAILED DESCRIPTION OF THE EMBODIMENTS

Figure 2:
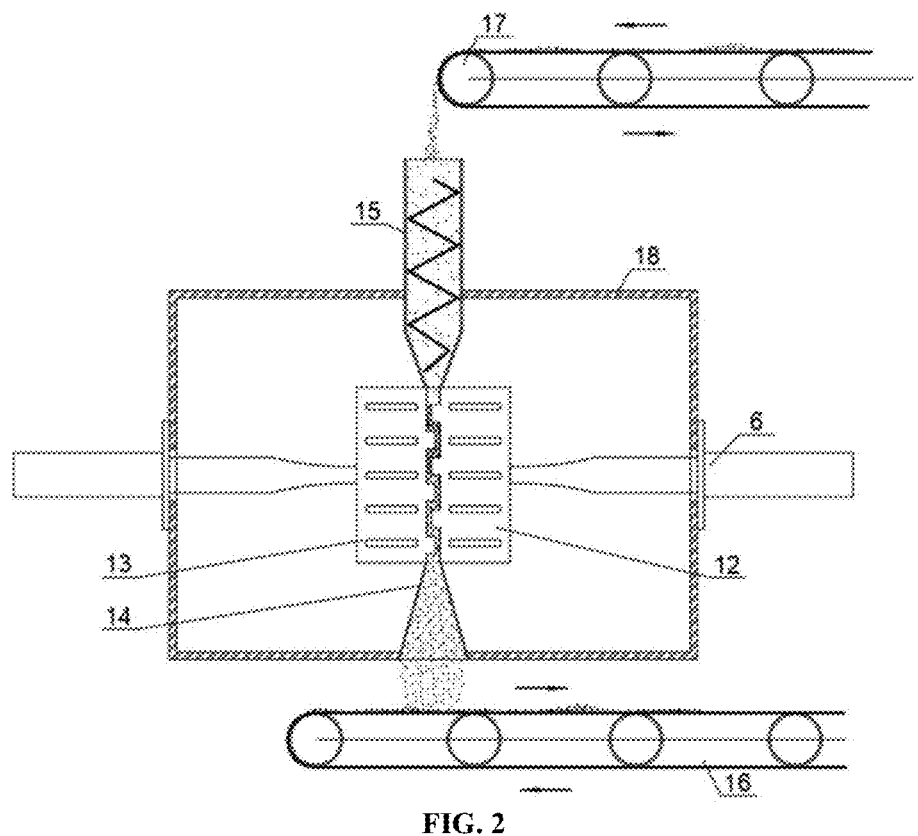
FIG. 2 is a structural schematic diagram of a production type processing device in Embodiment 2 of the present disclosure.
Figure 3A:
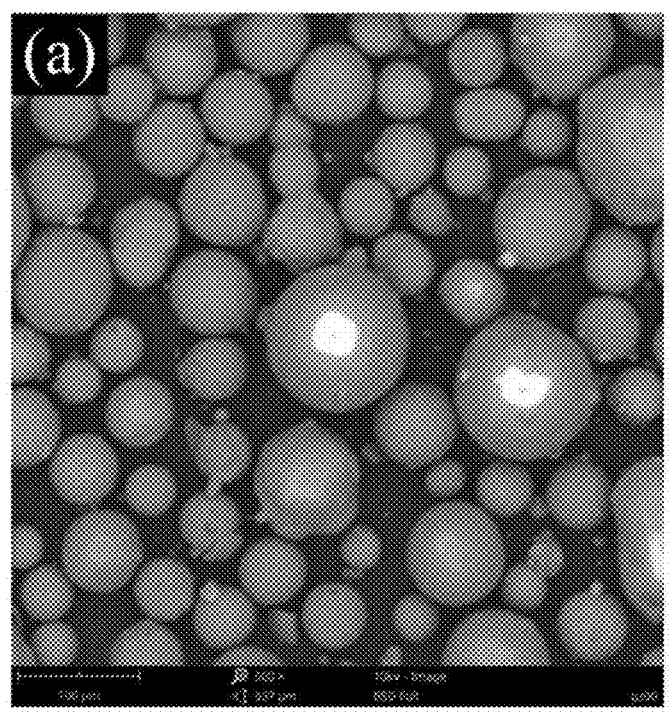
FIG. 3A is an electron microscope morphology photograph of fly ash floating beads amplified by 500 times before processing in the present disclosure.
Figure 3B:
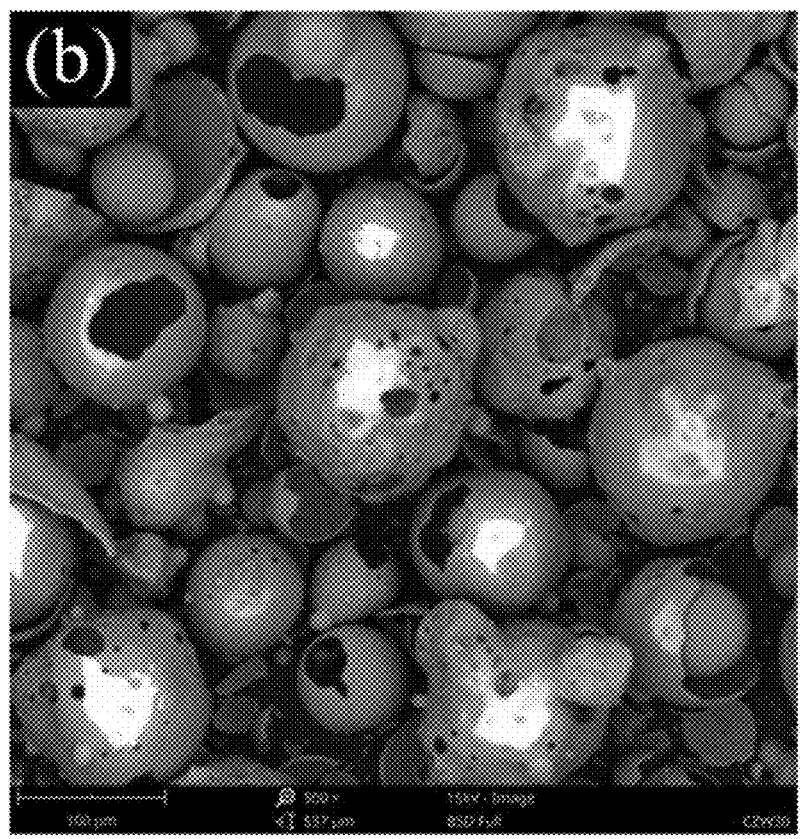
FIG. 3B is an electron microscope morphology photograph of the fly ash floating beads amplified by 500 times after processing with a method in the present disclosure.
Figure 4A:
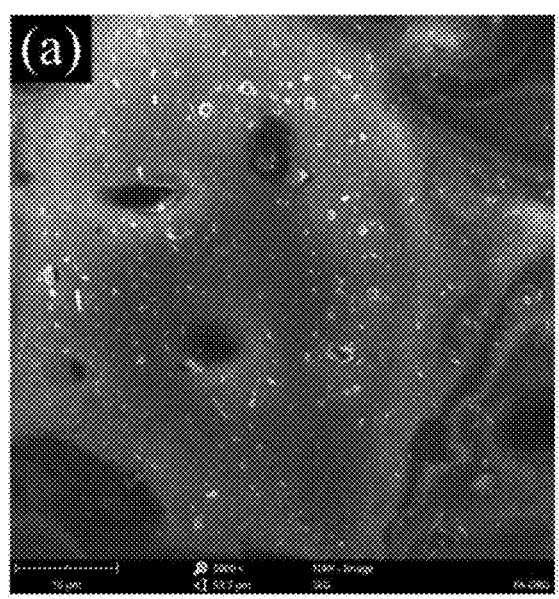
FIG. 4A is an electron microscope morphology photograph of fly ash floating beads amplified by 5000 times before processing in the present disclosure.
Figure 4B:
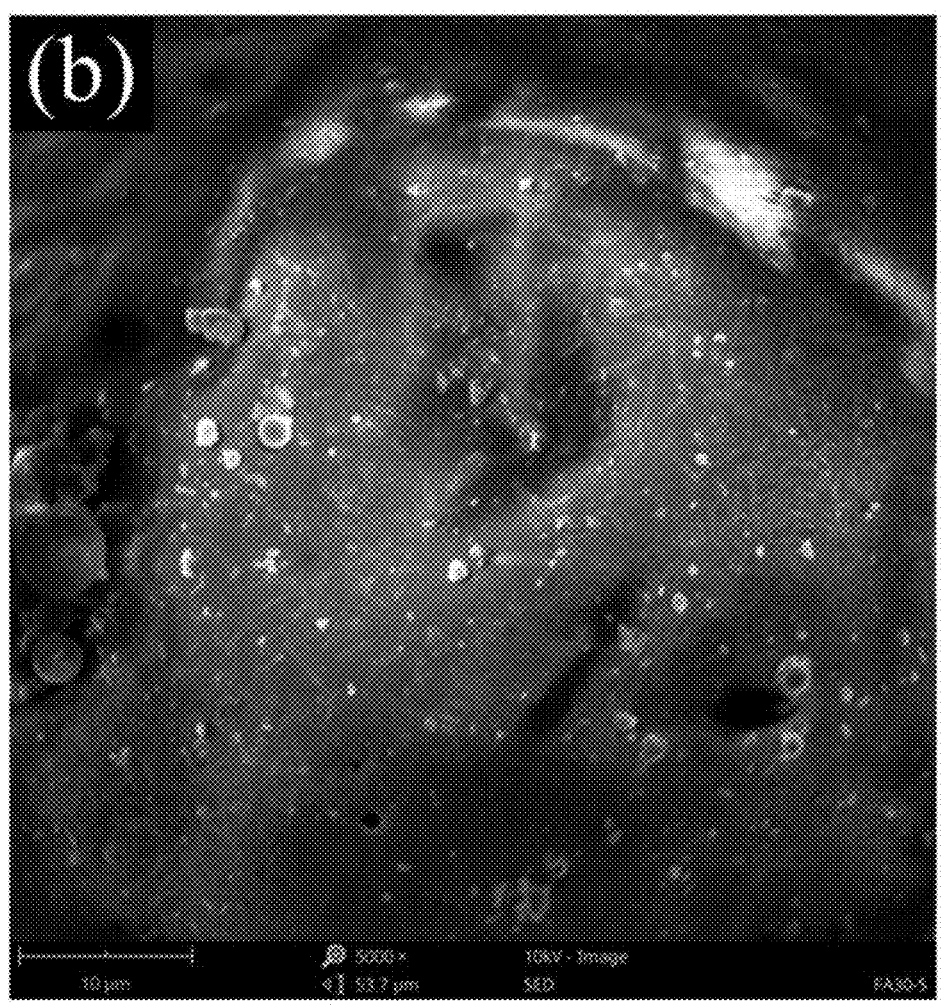
FIG. 4B is an electron microscope morphology photograph of the fly ash floating beads amplified by 5000 times after processing with the method in the present disclosure.

Referring to FIG. 1 and FIG. 2, high-frequency vibration nicking device for microbead surfaces in the Embodiment 1 and Embodiment 2 each include a high-frequency vibration assembly and a container. Microbeads or mixed materials of the microbeads and a grinding material are filled in the container. A vibration output end of the high-frequency vibration assembly is connected with the container and performs high-frequency vibration on the microbeads, or the vibration output end of the high-frequency vibration assembly is in direct contact with the microbeads, the high-frequency vibration assembly generates high-frequency vibration to drive the microbeads to perform high-frequency vibration motion in a limited space. When only the microbeads are added into the container, mutual collision and friction are generated among the microbeads, between the microbeads and the container wall and between the microbeads and the vibration output end; and when the mixed materials of the microbeads and the grinding material are added into the container, mutual collision and friction are generated among the microbeads, between the microbeads and the container wall, between the microbeads and the vibration output end and between the microbeads and the grinding material. The range of high-frequency vibration processing frequency output by the vibration output end of the high-frequency vibration assembly is from 1 KHz to 200 KHz. Electromagnetic excitation vibration is adopted when the high-frequency vibration processing frequency is from 1 KHz to 10 KHz, and ultrasonic vibration is adopted when the high-frequency vibration processing frequency is from 10 KHz to 200 KHz.

On the basis of this application, those skilled in the art can choose the time of applying vibration to the microbeads, and frequency of vibration according to the actual needs.

Under the condition of the same processing frequency, in order to achieve the same grade of nicking, the smaller the particle size of the microbead, the longer the processing time is.

Under the condition of the same processing time, in order to achieve the same grade of nicking, the smaller the particle size of the microbead, the higher the processing frequency is.

In principle, for microbeads with different particle sizes, the smaller the particle size, the higher the processing frequency is and the longer the processing time is. Those skilled in the art can choose appropriate processing frequency and processing time according to the requirements on the particle size and nicking grade of the microbead without any creative efforts. For organic microbeads or inorganic microbeads used in actual industrial production, the particle size is less than or equal to 500 μm, and the processing time is 1-180 seconds.

Embodiment 1

As shown in FIG. 1, Embodiment 1 provides a test type processing device suitable for laboratory tests. The high-frequency vibration assembly includes a vibration transducer 6 and a frame. The vibration transducer 6 and the container are both installed on the frame. The container is a closed or semi-closed hard container. The frame includes a bottom plate 1, a top plate 2 and a support shaft 3. Support shafts 4 are fixedly connected at two sides of a top of the bottom plate 1 through fixed seats 4. The top plate 2 is fixedly connected to a top end of the support shaft 3. The vibration transducer 6 is fixedly connected to a middle of the top plate 2. A middle of the top of the bottom plate 1 is fixedly connected with a support rod 11. An upper end of the support rod 11 is a polished rod. A lower end of the support rod 11 is a threaded rod. The threaded rod is in threaded connection with an adjusting nut 10. A pressure spring 9, a gasket 8 and a pressure sensor 5 sequentially are sleeved on the support rod 11 from bottom to top. One end of the pressure spring 9 abuts against a top of the adjusting nut 10, and the other end of the pressure spring 9 abuts against a bottom of the gasket 8. A top of the gasket 8 abuts against a bottom of the pressure sensor 5. The container is an accommodating tank 7. The accommodating tank 7 is installed on the top of the pressure sensor 5. The microbeads are filled into the accommodating tank 7. An end of the vibration transducer 6 is inserted into the accommodating tank 7. Due to the fact that positive and negative alternating vibration waves generated by the high-frequency vibration assembly drive the microbeads to move at extremely high acceleration, the microbeads are endowed with great acting force, and the problem of insufficient impact force of the microbeads caused by the principle of system similarity is overcome. Under the high-frequency vibration, tens of thousands to hundreds of thousands of impacts and frictions can occur on a single microbead per second, so the surface morphology of the microbead can be changed in seconds to tens of seconds, the surface roughness of the microbeads is improved, and the channel between the inner cavity and the surface of hollow microbead is formed.

When the device is specifically used, the microbeads are filled into the accommodating tank 7, and then the adjusting nut 10 is screwed to move on the screw part of the support rod 11, so as to push the pressure spring 9, the gasket 8, the sensor 5 and the accommodating tank 7 to move up along the polished rod, so that the end of the vibration transducer 6 is inserted into the accommodating tank 7 and presses the microbeads, and then an ultrasonic generator controls the vibration transducer 6 to emit high-frequency vibration on the microbeads. The vibration time and frequency are determined according to the actual needs to carry out surface modification on the microbeads. The vibration transducer 6 is an ultrasonic vibrator or an electromagnetic excitation vibrator.

Embodiment 2

As shown in FIG. 2, this embodiment provides a production type processing device suitable for industrial production. The high-frequency vibration assembly includes vibration transducers 6 and a frame. The vibration transducers 6 and the container are all installed on the frame. The container is a closed or semi-closed hard container. The frame includes a cabinet 18. The vibration transducers 6 are installed on the two sides of the cabinet 18. The ends of the vibration transducers 6 are inserted into the cabinet 18. A screw feeder 15 is installed on a top of the cabinet 18. The container includes a first die 12 and a second die 13. An end of one vibration transducer 6 is fixedly connected with the first die 12, and an end of the other vibration transducer 6 is fixedly connected with the second die 13. The first die 12 and the second die 13 are oppositely arranged. A gap between the first die 12 and the second die 13 is a microbead processing channel. A discharge end of the screw feeder 15 is connected with a feed end of the microbead processing channel A feed conveyor belt 17 is arranged above the screw feeder 15. A discharge end of the microbead processing channel is connected with a discharge pipe 14. A discharge end of the discharge pipe 14 passes through the cabinet 18, and a discharge conveyor belt 16 is arranged below the discharge end of the discharge pipe 14. Opposite surfaces of the first die 12 and the second die 13 are concave-convex surfaces which are matched with each other, and a cross-section of the microbead processing channel is curved, so that the contact area between the microbeads and the first die 12 as well as the second die 13 can be increased, thereby improving the processing effect.

The material is fed into the screw feeder 15 through the feed conveyor belt 17. The screw feeder 15 feeds the microbeads between the two dies. The first die 12 and the second die 13 are both driven by the vibration transducer 6 to generate ultrasonic vibration, and the ultrasonic vibration is acted on the microbeads. The processed microbeads fall down to the discharge conveyor belt 16 through the discharge pipe 14 and are transported. The uninterrupted processing of the microbeads is realized, thus greatly improving the processing efficiency.

Embodiment 3

A high-frequency vibration nicking method for microbead surfaces, using the high-frequency vibration nicking device for microbead surfaces in Embodiment 1 to perform high-frequency vibration nicking on the microbead surfaces, includes following steps.

Step A, adding fly ash floating beads with a particle size of 50-100 μm into the container (In other embodiments, mixed materials of the fly ash floating beads and a grinding material can also be added, and the grinding material includes but not limited to silicon carbide particles, corundum particles, and diamond particles. After the grinding material is added, the surface modification effect of the microbeads is strengthened, thereby improving the processing efficiency.).

Step B, turning on the high-frequency vibration assembly, where the vibration output end of the high-frequency vibration assembly is connected with the container, or the vibration output end of the high-frequency vibration assembly is in direct contact with the fly ash floating beads.

Step C, performing high-frequency vibration on the fly ash floating beads by the high-frequency vibration assembly, where the fly ash floating beads in the container under the action of the high-frequency vibration assembly vibrate with high frequency, where when only the fly ash floating beads are added into the container, mutual collision and friction are generated among the fly ash floating beads, between the fly ash floating beads and the container wall and between the fly ash floating beads and the vibration output end; and when the mixed materials of the fly ash floating beads and a grinding material are added into the container, mutual collision and friction are generated among the fly ash floating beads, between the fly ash floating beads and the container wall, between the fly ash floating beads and the vibration output end and between the fly ash floating beads and the grinding material.

The high-frequency vibration processing frequency output by the vibration output end of the high-frequency vibration assembly is 20 KHz. In other embodiments, any frequency is selected between 1 KHz and 200 KHz for processing according to the actual needs. A vibration mode of the high-frequency vibration assembly can be a fixed frequency or a sweep frequency mode. In this embodiment, the vibration mode is a fixed frequency, and the processing time is 30 seconds. As shown in 3b and 4b, in this embodiment, ultrasonic vibration nicking is carried out on the fly ash floating beads, thereby effectively improving the surface roughness of the fly ash floating beads and opening the inner cavity of the fly ash floating bead, and a good processing effect is achieved. Compared with the existing strong acid corrosion method, the method has obvious advantages in the aspects of cost, efficiency and environmental protection, especially in the aspect of environmental protection. The method in the present disclosure is simple and effective, can realize large-scale industrial production, and has great significance for the popularization and application of microbead materials in various industries, especially for low-grade fly ash and volcanic ash with huge discharge amount.

In other embodiments, the microbeads can be other inorganic microbeads or organic microbeads. The inorganic microbeads can be glass microbeads, ceramic microbeads, fly ash, volcanic ash, silica microbeads, metal microbeads, metal oxide microbeads or alloy microbeads, and the organic microbeads can be polymer microbeads or plastic microbeads. A diameter of the microbead is less than or equal to 500 μm. According to the technical solution of the embodiment, the purposes of the present disclosure can be achieved.

In the field of medicine and chemical engineering, the surface roughness and specific surface area of the microbeads are increased after surface nicking, the inner cavity of the hollow microbead is communicated, the microbeads can absorb, accommodate and carry more substances, and the effects of promoting reaction and drug sustained release can be achieved.

In the field of building materials, on one hand, the adhesive force with gel materials is increased after surface nicking of fly ash and volcanic ash microbeads, on the other hand, the active substances inside the hollow beads can participate in the hydration reaction, so that the strength of the material can be improved without destroying the structural integrity of the microbeads, thereby achieving a purpose of light weight and high strength.

It needs to be emphasized that on the basis of the embodiment, those skilled in the art can choose the time of applying vibration to the microbeads, and frequency of vibration according to the actual needs.

Under the condition of the same processing frequency, in order to achieve the same grade of nicking, the smaller the particle size of the microbead, the longer the processing time is.

Under the condition of the same processing time, in order to achieve the same grade of nicking, the smaller the particle size of the microbead, the higher the processing frequency is.

In principle, for microbeads with different particle sizes, the smaller the particle size, the higher the processing frequency is and the longer the processing time is. Those skilled in the art can choose appropriate processing frequency and processing time according to the requirements of the particle size and nicking grade of the microbead without any creative efforts. For organic microbeads or inorganic microbeads used in actual industrial production, the particle size is less than or equal to 500 μm, and the processing time is 1-180 seconds.

Obviously, the embodiments are merely illustrative of the present disclosure as examples and are not intended to be limitation of embodiments of the present disclosure. For those of ordinary skill in the art, other variations or modifications in different forms may be made on the basis of the above description. All embodiments need not be exhaustive or otherwise impossible to be exhaustive herein. Obvious changes or variations which belong to the technical scheme of the present disclosure are still within the scope of protection of the present disclosure.

What is claimed is:

1. A high-frequency vibration nicking method for microbead surfaces, using a high-frequency vibration nicking device to perform high-frequency vibration nicking on the microbead surfaces, wherein the high-frequency vibration nicking device comprises a high-frequency vibration assembly and a container, microbeads or mixed materials of the microbeads and a grinding material are filled in the container, and a vibration output end of the high-frequency vibration assembly is connected with the container to perform high-frequency vibration on the microbeads, or the vibration output end of the high-frequency vibration assembly is in direct contact with the microbeads, wherein the high-frequency vibration assembly comprises a vibration transducer and a frame, the vibration transducer and the container are installed on the frame, the container is a closed or semi-closed hard container, the frame comprises a bottom plate, a top plate and support shafts, the support shafts are fixedly connected at two sides of a top of the bottom plate through fixed seats respectively, the top plate is fixedly connected to top ends of the support shafts, the vibration transducer is fixedly connected to a middle of the top plate, a middle of the top of the bottom plate is fixedly connected with a support rod, an upper end of the support rod is a polished rod, a lower end of the support rod is a threaded rod, the threaded rod is in threaded connection with an adjusting nut, a pressure spring, a gasket and a pressure sensor are sequentially sleeved on the support rod from bottom to top, an end of the pressure spring abuts against a top of the adjusting nut, another end of the pressure spring abuts against a bottom of the gasket, and a top of the gasket abuts against a bottom of the pressure sensor; and the container is configured as an accommodating tank, the accommodating tank is installed on a top of the pressure sensor, the microbeads are filled into the accommodating tank, and an end of the vibration transducer is the vibration output end of the high-frequency vibration assembly and is inserted into the accommodating tank;

the method comprising following steps:

step A, adding microbeads or mixed materials of the microbeads and a grinding material into a container;

step B, turning on the high-frequency vibration assembly, wherein the vibration output end of the high-frequency vibration assembly is connected with the container, or the vibration output end of the high-frequency vibration assembly is in direct contact with the microbeads; and step C, performing high-frequency vibration on the microbeads by the high-frequency vibration assembly, wherein the microbeads in the container vibrate with high-frequency under action of the high-frequency vibration assembly, when only the microbeads are added into the container, mutual collision and friction are generated among the microbeads, between the microbeads and a container wall and between the microbeads and the vibration output end; and when the mixed materials of the microbeads and the grinding material are added into the container, mutual collision and friction are generated among the microbeads, between the microbeads and the container wall, between the microbeads and the vibration output end and between the microbeads and the grinding material.

2. The high-frequency vibration nicking method for microbead surfaces according to claim 1, wherein a range of high-frequency vibration processing frequency output by the vibration output end of the high-frequency vibration assembly is between 1 KHz and 200 KHz.

3. The high-frequency vibration nicking method for microbead surfaces according to claim 2, wherein the microbeads are inorganic microbeads or organic microbeads, and diameters of the microbeads are less than or equal to 500 μm.

4. The high-frequency vibration nicking method for microbead surfaces according to claim 3, wherein the inorganic microbeads are glass microbeads, ceramic microbeads, fly ash, volcanic ash, silica microbeads, metal microbeads, metal oxide microbeads or alloy microbeads, and the organic microbeads are polymer microbeads or plastic microbeads.

5. The high-frequency vibration nicking method for microbead surfaces according to claim 1, wherein electromagnetic excitation vibration is adopted when the high-frequency vibration processing frequency is between 1 KHz and 10 KHz, and ultrasonic vibration is adopted when the high-frequency vibration processing frequency is between 10 KHz and 200 KHz.

6. The high-frequency vibration nicking method for microbead surfaces according to claim 1, wherein the microbeads are inorganic microbeads or organic microbeads, and diameters of the microbeads are less than or equal to 500 μm.

\* \* \* \* \*